United States Patent [19]
Yamada et al.

[11] Patent Number: 6,092,782
[45] Date of Patent: Jul. 25, 2000

[54] OPENING AND CLOSING VALVE

[75] Inventors: Hirosuke Yamada, Ibaraki-ken; Kazuya Tamura, Soka; Nobuhiro Fujiwara, Ibaraki-ken, all of Japan

[73] Assignee: SMC Kabushiki Kaisha, Tokyo, Japan

[21] Appl. No.: 09/100,748

[22] Filed: Jun. 22, 1998

[30] Foreign Application Priority Data

Jul. 11, 1997 [JP] Japan ................................. 9-187047

[51] Int. Cl.[7] .......................... F16K 31/02; B65D 25/40; B05B 15/02; F23D 11/34; F23D 11/38; F23D 14/50
[52] U.S. Cl. ...................... 251/129.04; 222/571; 239/119
[58] Field of Search ........................ 251/129.04, 129.17, 251/335.2; 222/571; 239/104, 106, 119

[56] References Cited

U.S. PATENT DOCUMENTS 2,735,047  2/1956  Garner et al. ...................... 251/129.19
4,666,125  5/1987  Marts et al. ........................ 251/129.19

FOREIGN PATENT DOCUMENTS 0 197 575  10/1986  European Pat. Off. .
2 109 458  6/1983   United Kingdom .

*Primary Examiner*—Kevin Shaver
*Assistant Examiner*—David A Bonderer
*Attorney, Agent, or Firm*—Oblon, Spivak, McClelland, Maier & Neustadt, P.C.

[57] ABSTRACT

A opening and closing valve comprises ROM in which a plurality of valve-closing program control patterns are stored in order to avoid liquid drip when the valve is closed. The valve further comprises a control unit for controlling a valve plug lift position in a direction to close the valve by controlling an amount of electric power application to a linear voice coil type driving unit in accordance with the valve-closing program control pattern.

8 Claims, 5 Drawing Sheets

OPENING AND CLOSING VALVE

BACKGROUND OF THE INVENTION

1. Field of the Invention

The present invention relates to an opening and closing valve to be used in place of a suck back valve. In particular, the present invention relates to an opening and closing valve which makes it possible to avoid liquid drip caused, for example, from a discharge port of a fluid nozzle connected to a fluid outlet side of the opening and closing valve when the valve is closed, so that the thickness of fluid may be stabilized on a surface applied with the fluid.

2. Description of the Related Art

The suck back valve has been hitherto used, for example, in steps of producing semiconductor wafers. The suck back valve has a function to avoid so-called liquid drip in which a minute amount of coating liquid drips from a discharge port of a fluid nozzle connected to a fluid outlet side of the suck back valve to a semiconductor wafer when the supply of the coating liquid to the semiconductor wafer is stopped by operating an opening and closing valve connected to a fluid inflow side of the suck back valve so that the valve is closed.

A conventional suck back valve is shown in FIG. 5. Such a suck back valve is disclosed, for example, in Japanese Utility Model Publication No. 8-10399. The suck back valve 10 comprises a main valve body 18 formed with a fluid passage 16 for communicating a fluid inlet port 12 with a fluid outlet port 14, and a bonnet 20 connected to the top of the main valve body 18.

For example, a coating liquid supply source 23 is connected to the fluid inlet port 12 via an opening and closing valve 21. A diaphragm 26, which is formed of a material such as fluororesin, is displaceably provided in the fluid passage 16. A chamber 17, which is closed by the diaphragm 26, communicates with a passage 19 for supplying and discharging air in the chamber 17 when the diaphragm 26 is displaced. A thick-walled section 22 is formed at a central portion of the diaphragm 26, and a thin-walled section 24 is formed at the circumference of the thick-walled section 22.

A projection 27 is formed at the top of the thick-walled section 22. The projection 27 engages with a recess 29 defined at a lower end of a piston 30. Thus, the diaphragm 26 is connected to the piston 30. A V-packing 32, which slides on the inner wall surface of the main valve body 18 and which functions as a seal, is installed to the piston 30. A spring 34, which always presses the piston 30 upwardly, is provided in the main valve body 18. A compressed air supply port 28 is formed through the bonnet 20. The compressed air supply port 28 is connected to a compressed air supply source 35 via a flow amount control valve 33 for controlling the flow amount to move the thick-walled section 22 in the vertical direction. Reference numeral 36 indicates an adjusting screw for adjusting the flow amount of the coating liquid drawn by the diaphragm 26, by abutting against the piston 30 to control the displacement amount of the piston 30.

The operation of the suck back valve 10 will be schematically described. In an ordinary state, the opening and closing valve 21 is open, and the coating liquid is supplied from the fluid inlet port 12 to the fluid outlet port 14. In this state, the flow amount control valve 33 is controlled to supply the compressed air from the compressed air supply source 35 to the compressed air supply port 28. Accordingly, the pressure of the compressed air causes downward displacement of the piston 30. The diaphragm 26, which is connected to the piston 30, protrudes into the fluid passage 16 as shown by two-dot chain lines in FIG. 5.

When the flow of the coating liquid is stopped in the fluid passage 16, the flow amount control valve 33 is controlled to stop the supply of the compressed air from the compressed air supply source 35 to the compressed air supply port 28. Thus, the piston 30 and the diaphragm 26 are moved upwardly in an integrated manner by the aid of the resilient force exerted by the spring 34. The piston 30 abuts against the forward end of the adjusting screw 36, and its displacement is restricted. A predetermined amount of the coating liquid, which remains in the fluid passage 16, is sucked in accordance with the negative pressure effected by the diaphragm 26. Thus, the liquid drip is prevented at the coating liquid supply port of an unillustrated fluid nozzle connected to the fluid outlet port 14.

SUMMARY OF THE INVENTION

A general object of the present invention is to provide an opening and closing valve which makes it possible to avoid liquid drip from a discharge port of a fluid nozzle by controlling the flow amount during the process to close the valve.

A principal object of the present invention is to provide an opening and closing valve in which a conventional opening and closing valve and a suck back valve are combined into one unit.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
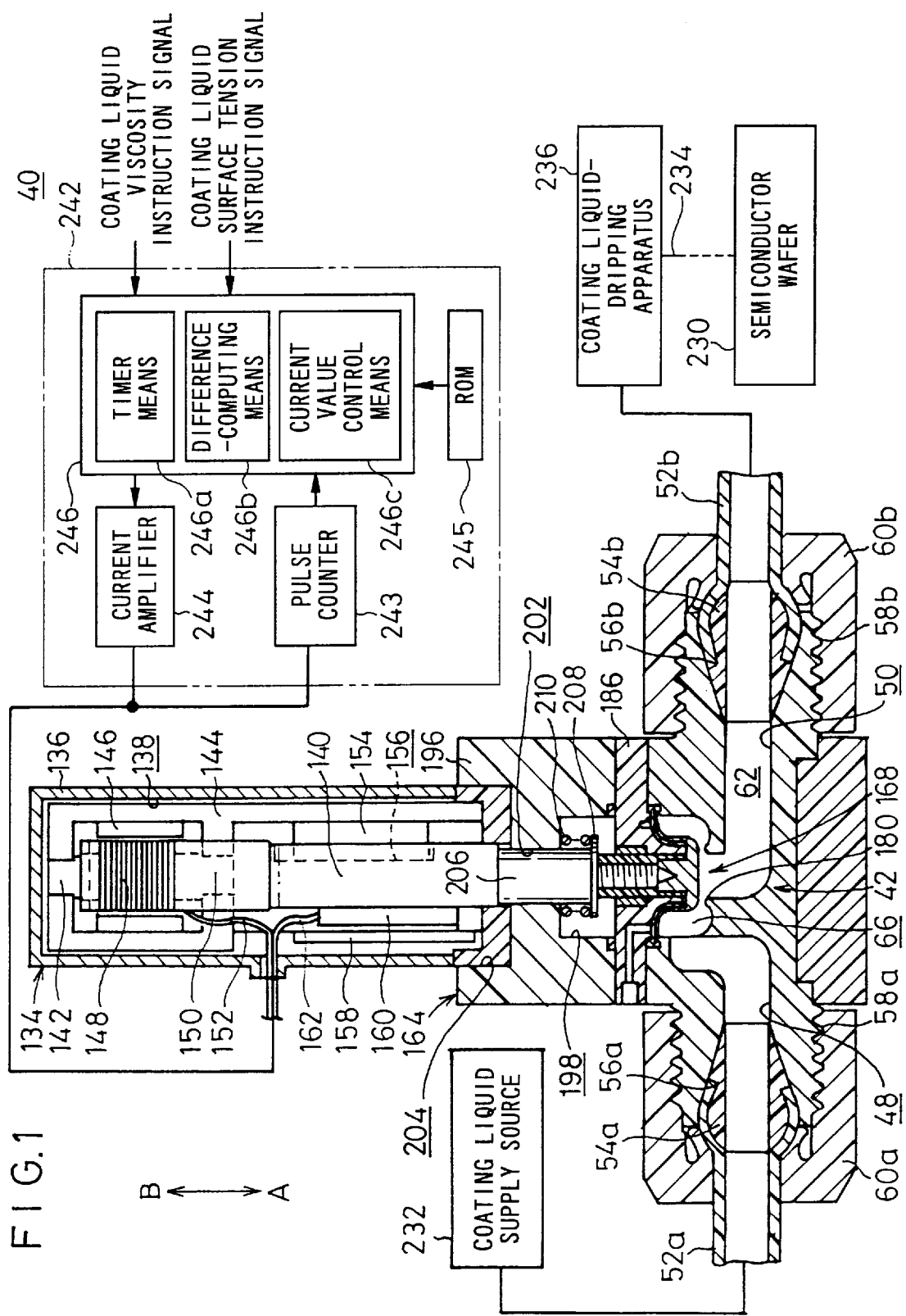
FIG. 1 shows a longitudinal cross-sectional view illustrating a schematic arrangement of an opening and closing valve according to an embodiment of the present invention.

With reference to FIG. 1, reference numeral 40 indicates an opening and closing valve according to an embodiment of the present invention. The opening and closing valve 40 comprises a valve body 42. A first port 48 is formed at one end of the valve body 42, and a second port 50 is formed at the other end thereof. Connecting members 54a, 54b, with which forward ends of tubes 52a, 52b are engaged respectively, are provided for the first and second ports 48, 50. The ends of the tubes 52a, 52b are engaged with step sections 56a, 56b formed on the outer circumferences of the connecting members 54a, 54b. Thus, the tubes 52a, 52b are positioned. External threads 58a, 58b are threaded on end portions of the valve body 42. Cap nuts 60a, 60b are screwed into the external threads 58a, 58b. Thus, the tubes 52a, 52b are connected to the first port 48 and the second port 50 of the valve body 42 in a liquid-tight manner respectively.

A fluid passage 62, which makes communication between the first port 48 and the second port 50, is defined through the valve body 42. The fluid passage 62 is formed to communicate with a recess 66 of the valve body 42.

Figure 2A:
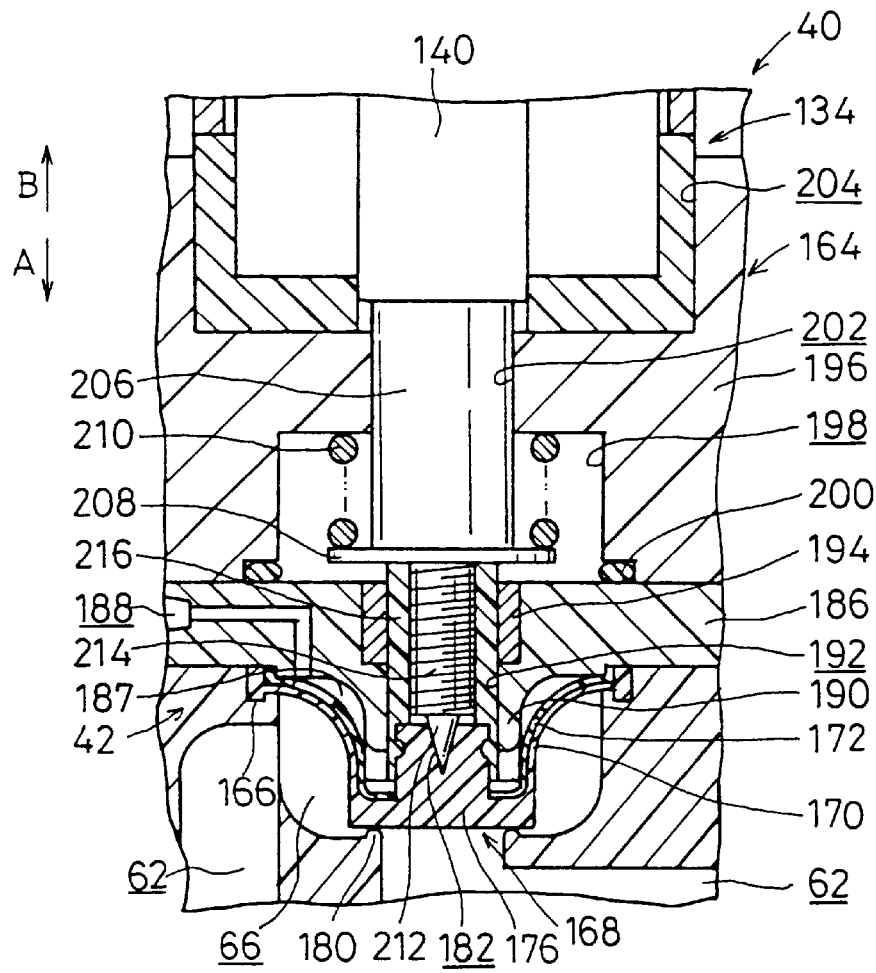
FIG. 2A shows a partially magnified longitudinal cross-sectional view of the opening and closing valve according to the embodiment of the present invention.
Figure 2B:
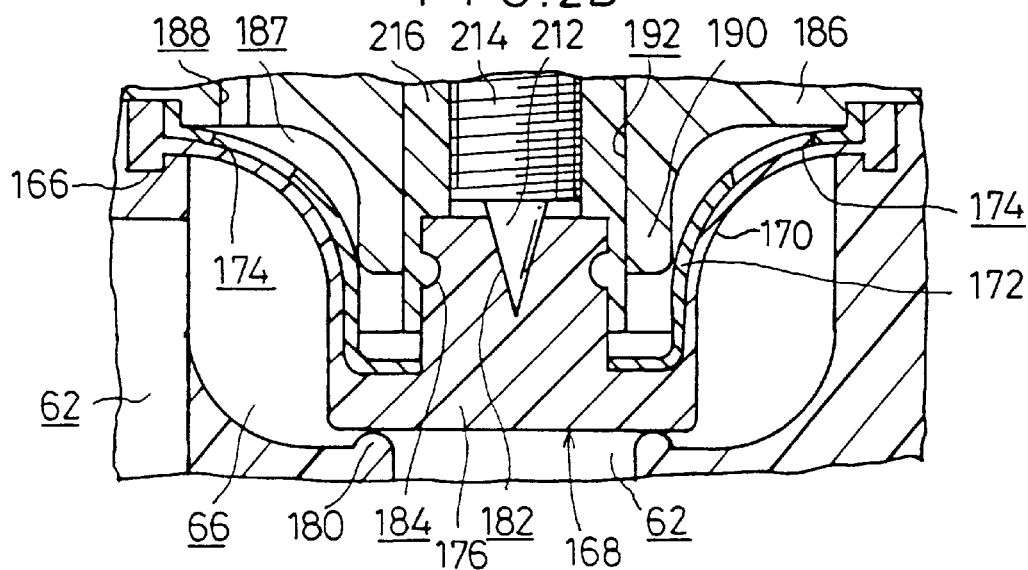
FIG. 2B shows a partially magnified cross-sectional view illustrating details of a valve plug shown in FIG. 2A.

As shown in FIGS. 2A and 2B, the opening and closing valve 40 comprises a valve plug 168 which is formed by a diaphragm and which is engaged with a step section 166 formed on a wall section of the recess 66. The valve plug 168 is composed of a first thin film 170 and a second thin film 172 which are stacked with each other. A plurality of small holes 174 are defined in the second thin film 172.

A thick-walled section 176 is formed at a central portion of the first thin film 170. Accordingly, when the thick-walled section 176 is displaced in a direction of the arrow A by flexibly bending the first thin film 170, then the thick-walled section 176 is seated on a seat section 180 formed at an opening of the fluid passage 62, and the fluid passage 62 is blocked. On the other hand, when the thick-walled section 176 is displaced in a direction of the arrow B. and it is separated from the seat section 180, then the first port 48 communicates with the second port 50. A recess 182 having a substantially V-shaped cross section is defined at the top of the thick-walled section 176. A circumscribing groove 184 is formed on the outer wall of the thick-walled section 176.

The valve body 42 is provided with a holding member 186 which surrounds the valve body 42. The first thin film 170 and the second thin film 172 are interposed at their edges by the holding member 186 and the step section 166 of the valve body 42. A chamber 187, which is closed by the valve plug 168, is formed for the holding member 186. A passage 188, which communicates with the chamber 187, is defined through the holding member 186. The passage 188 is formed to make communication with the outside. The holding member 186 is formed with a projection 190 which protrudes downwardly. A hole 192 is defined through a central portion of the projection 190. The thick-walled section 176 of the valve plug 168 is inserted and fitted to the hole 192. A bushing 194 is formed on a wall for forming the hole 192.

A body 196 is secured to the top of the holding member 186. A recess 198, which communicates with the hole 192, is defined in the body 196. An O-ring 200 is provided at the opening of the recess 198. A recess 204, which communicates with the recess 198 via a hole 202, is defined at an upper portion of the body 196.

As shown in FIG. 1, a linear voice coil type driving unit 134, which is composed of an electric actuator, is provided in the recess 204. The linear voice coil type driving unit 134 comprises a housing 136. The housing 136 has a chamber 138 in which a lengthy stem 140 is provided displaceably in a direction of the arrow A or B. A fixed iron core 142 is provided at an upper central position in the chamber 138. The fixed iron core 142 is formed to extend by a predetermined length along the longitudinal direction of the housing 136.

A fixed pole magnet 146 is arranged in the chamber 138. The fixed pole magnet 146 is separated from the fixed iron core 142 by a predetermined spacing distance, and it is secured to the inner wall surface of the housing 136 by the aid of a support member 144. In this embodiment, a substantially horizontal magnetic field is formed between the fixed pole magnet 146 and the fixed iron core 142. A displacement member (bobbin) 150, around which an electromagnetic coil 148 is wound, is interposed between the fixed iron core 142 and the fixed pole magnet 146. The displacement member 150 is integrally displaceable with the stem 140 by the aid of a connecting pin (not shown). A predetermined clearance is formed between the fixed iron core 142 and the displacement member 150. Reference numeral 152 indicates a lead wire for allowing a current to flow from a control unit 242 to the electromagnetic coil 148 in order to operate the stem 140.

A guide member 154 is provided on the inner wall surface of the housing 136 via the support member 144. The guide member 154 is engaged with a recess 156 of the stem 140 to function as follows. That is, the stem 140 is linearly guided, and the displacement amount of the stem 140 is restricted.

An encoder (lift-detecting means) 160 is secured via a support member 158 to an inner wall portion of the housing 136 disposed on a side opposite to the guide member 154. The encoder (or lift-detecting means) 160 comprises an unillustrated photosensor which is fixed on the side of the housing 136, and an unillustrated glass scale which is fixed on the side of the stem 140 and which has scale values formed at constant spacing distances. In this embodiment, the displacement amount of the stem 140 is detected by the unillustrated photosensor by the aid of the glass scale. A pulsed detection signal, which is given by the photosensor, is fed via a lead wire 162 to the control unit 242 in a feedback manner.

A rod-shaped displacement member 206 is secured to the bottom of the stem 140 of the linear voice coil type driving unit 134. The displacement member 206 is inserted into the hole 202 and the recess 198. As shown in FIG. 2A, a flange section 208 is formed at the outer circumference of the displacement member 206. One end of a coil spring 210 is seated on the top surface of the flange section 208. The other end of the coil spring 210 is seated on the top surface portion for forming the recess 198.

Therefore, the displacement member 206 is in a state of being urged in the direction of the arrow A by the resilient force of the coil spring 210. A conical section 212 is formed at the forward end of the displacement member 206. The conical section 212 enters the recess 182 of the thick-walled section 176. The thick-walled section 176 is interposed between the conical section 212 and a cylindrical member 216 screwed into an external thread 214 formed on the displacement member 206.

The encoder (or lift-detecting means) 160, the stem 140, the displacement member 206, and the valve plug 168 are constructed to make integrated displacement in the direction of the arrow A or B.

The control unit 242 comprises a pulse counter 243 for receiving and counting pulsed detection signals outputted from the encoder (or lift-detecting means) 160 to obtain a counted value corresponding to the lift position of the valve plug 168, a current amplifier 244 for amplifying a current value signal and applying an amplified current to the electromagnetic coil 148, ROM (storage means) 245 for storing a control program for controlling a central processing unit 246 described later on and a plurality of valve-closing program control patterns used to close the valve, and the central processing unit 246 for comparing the lift position of the valve plug 168 based on the counted value obtained by the pulse counter 243 with a lift position of the valve plug 168 based on the valve-closing program control pattern to determine a difference therebetween under the control of the control program stored in ROM 245 so that a current value signal based on the difference is supplied to the current amplifier 244.

In this embodiment, the central processing unit 246 functionally comprises a timer means 246a for measuring time at every predetermined time interval, a difference-computing means 246b for determining the difference between the lift position of the valve plug 168 based on the valve-closing program control pattern at every predetermined time interval and the lift position of the valve plug 168 based on the counted value obtained by the pulse counter 243, and a current value control means (current amount control means) 246c for outputting the current value signal based on the difference in order to make the difference determined by the difference-computing means 246b to be zero.

The encoder (or lift-detecting means) 160 as well as the current amplifier 244, the pulse counter 243, the timer means 246a, the difference-computing means 246b, and the current value control means 246c except for ROM 245 function as a control means.

The opening and closing valve 40 according to the embodiment of the present invention is basically constructed as described above. Next, its operation, function, and effect will be explained.

As shown in FIG. 1, a coating liquid-dripping apparatus 236, which is provided with a fluid nozzle 234 for dripping the coating liquid toward a semiconductor wafer 230, is connected to the tube 52b communicating with the second port 50 of the opening and closing valve 40. On the other hand, a coating liquid supply source 232, in which the coating liquid to be dripped toward the semiconductor wafer 230 is stored for supplying the coating liquid at a predetermined pressure, is connected to the tube 52a communicating with the first port 48. The control unit 242 is connected to the linear voice coil type driving unit 134 and the encoder (or lift-detecting means) 160 respectively.

When the linear voice coil type driving unit 134 for the opening and closing valve 40 is operated by the control unit 242 to allow the current to flow through the electromagnetic coil 148, the electromagnetic force is generated in the electromagnetic coil 148. The stem 140 and the displacement member 150 wound with the electromagnetic coil 148 are integrally displaced in the direction of the arrow A in accordance with the so-called Fleming's left hand rule by the aid of the interaction between the electromagnetic force and the magnetic field formed by the fixed pole magnet 146 and the fixed iron core 142. The electromagnetic force is adjustable to give a desired magnitude and a duration time by appropriately regulating the magnitude of the current allowed to flow through the electromagnetic coil 148. The direction of the force is changeable to the direction of the arrow A or B by inverting the polarity of the current allowed to flow through the electromagnetic coil 148.

When the stem 140 is displaced in the direction of the arrow B, then the displacement member 206 is displaced against the resilient force of the coil spring 210, and the thick-walled section 176 of the valve plug 168 is separated from the seat section 180. Thus, the first port 48 communicates with the second port 50.

After the foregoing preparatory steps, when the coating liquid supply source 232 is operated, then the coating liquid passes through the one tube 52a, the fluid passage 62, and the other tube 52b, and it is supplied to the coating liquid-dripping apparatus 236. The coating liquid is dripped from the fluid nozzle 234 to the semiconductor wafer 230. As a result, a coating film (not shown) having a desired thickness is formed on the semiconductor wafer 230.

Figure 3:
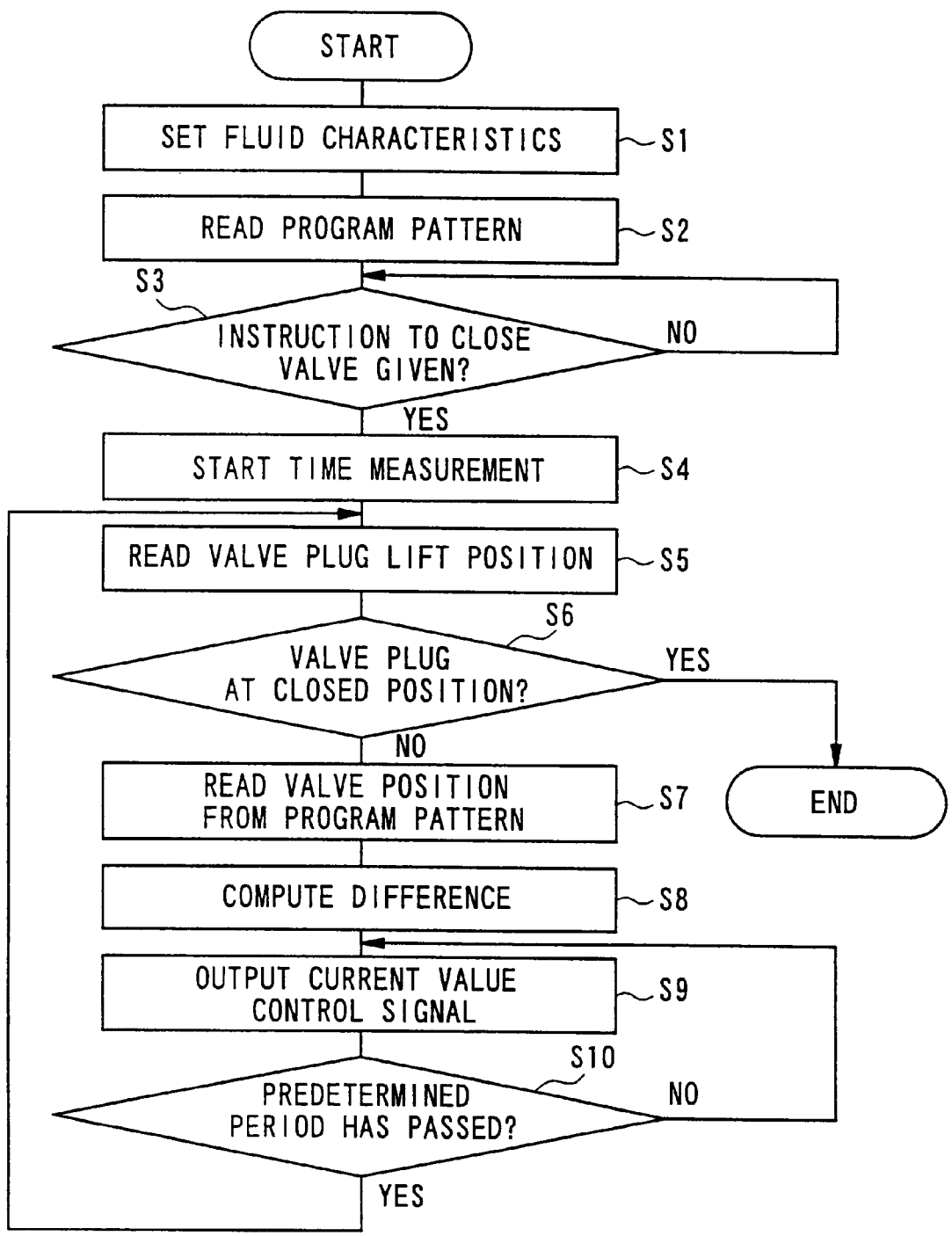
FIG. 3 shows a flow chart for explaining the function of the opening and closing valve according to the embodiment of the present invention during the process to close the valve.

Next, the process to close the opening and closing valve 40 will be explained with reference to a flow chart shown in FIG. 3.

When the opening and closing valve 40 is instructed to open the valve, execution of the program is started. A viscosity instruction signal and a surface tension instruction signal, which are set for the coating liquid as a fluid, are read by the control unit 242 (step S1).

Specifically, the valve-closing program control pattern is affected by the viscosity and the surface tension of the coating liquid as well as the pressure of the coating liquid fed from the coating liquid supply source 232, the ambient temperature, and the volume from the opening and closing valve 40 to the forward end of the fluid nozzle 234 including the coating liquid-dripping apparatus 236. However, in the apparatus for which the opening and closing valve 40 of this embodiment is provided, the pressure of the coating liquid fed from the coating liquid supply source 232, the ambient temperature, and the volume from the opening and closing valve 40 to the forward end of the fluid nozzle 234 including the coating liquid-dripping apparatus 236 are established before installation of the opening and closing valve 40. Therefore, it is assumed that these parameters have been already reflected to the valve-closing program control pattern stored in ROM 245. This embodiment is illustrative of a case in which the system is applied to only the change in coating liquid to be used.

After the execution of the step S1, the opening and closing valve 40 is controlled so that it is open.

After the control of the opening and closing valve 40 in the open state following the step S1, a corresponding valve-closing program control pattern is read from ROM 245 on the basis of the viscosity instruction signal and the surface tension instruction signal for the coating liquid having been read into the system. The valve-closing program control pattern is sent to and stored in unillustrated RAM (step S2). An example of the valve-closing program control pattern is shown in FIG. 4.

Figure 4:
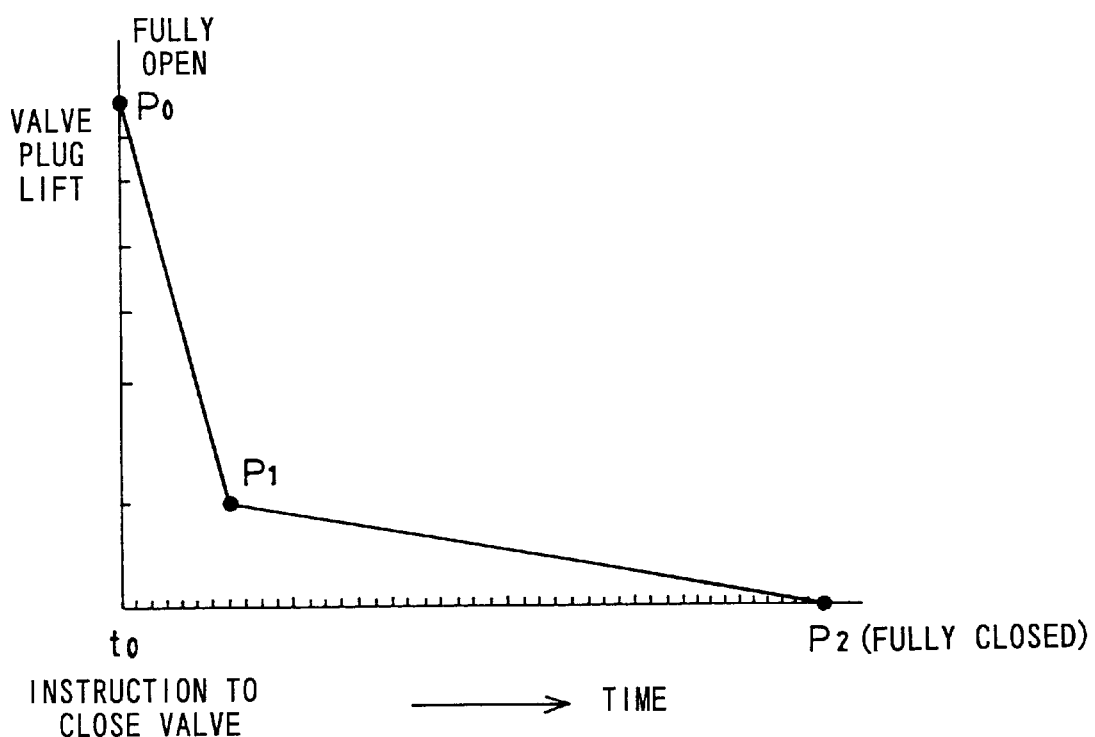
FIG. 4 schematically shows a valve-closing program control pattern for the suck back valve according to the embodiment of the present invention.
Figure 5:
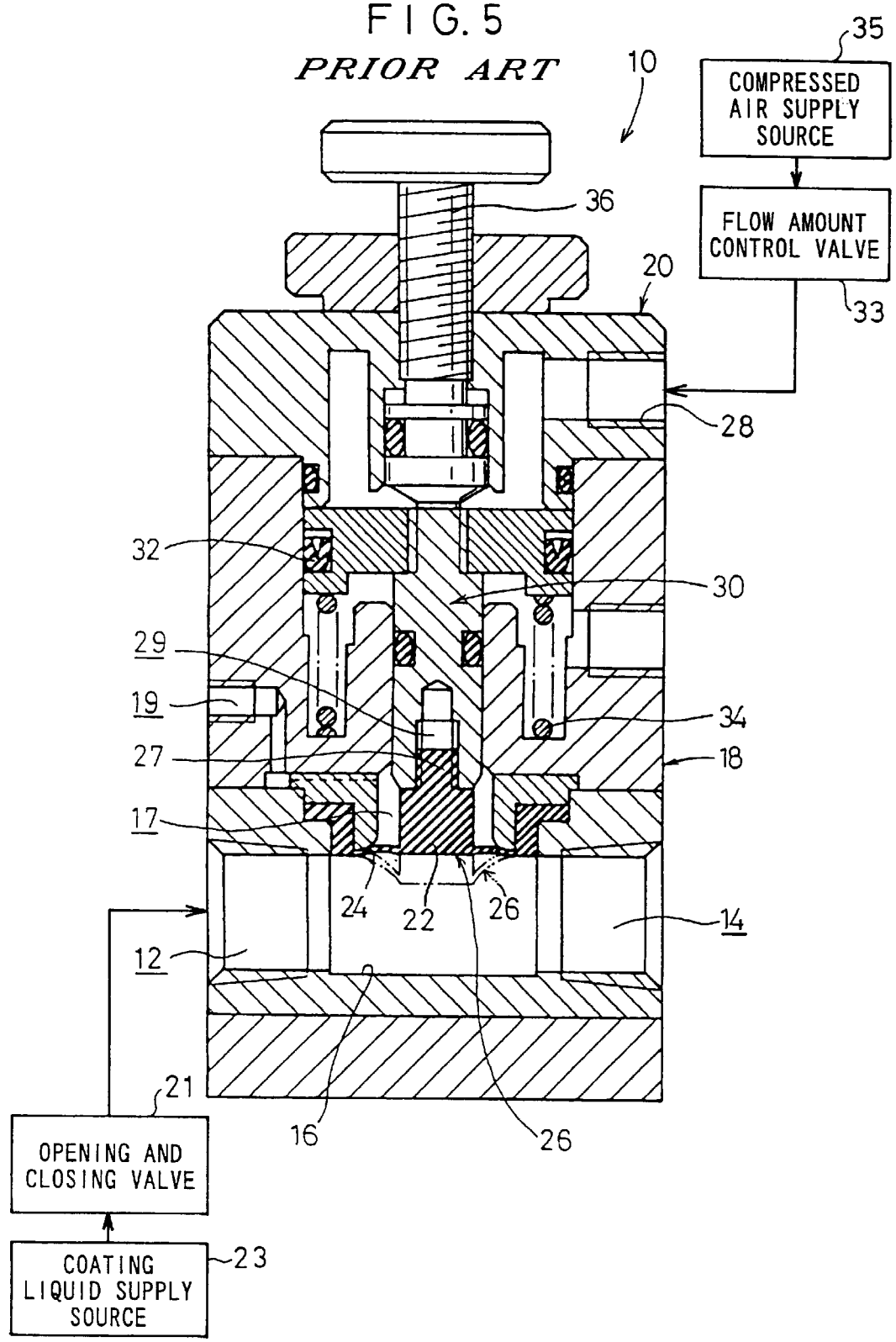
FIG. 5 shows a schematic longitudinal cross-sectional view illustrating a conventional suck back valve.

As also clarified from FIG. 4, the opening degree of the valve with respect to the passed time from the time $t_0$ of instruction to close the valve, i.e., the lift position of the valve plug 168 is demonstrated. The valve-closing program control pattern is set such that the valve plug 168 is moved in the direction to close the valve at a steep slope predetermined with respect to the time until the lift position of the valve plug 168 arrives at the position $P_1$, while the valve plug 168 is moved in the direction to close the valve at a gentle slope predetermined with respect to the time until the closure after the lift position has arrived at the position $P_1$. The reason why such a valve-closing program control pattern is adopted will be described later on.

After the step S2, the routine wait for the instruction to close the valve (step S3). When the instruction to close the valve is given, the time measurement is started by using the timer means 246a (step S4). Subsequently, the counted value obtained by the pulse counter 243 is read (step S5). After the step S5, it is checked whether or not the valve plug 168 arrives at the fully closed position (step S6).

If it is judged in the step S6 that the valve plug 168 does not arrive at the fully closed position, reference is made to the valve-closing program control pattern. The lift position of the valve plug 168, which corresponds to the next time measurement timing effected by the timer means 246a, is read from the valve-closing program control pattern (step S7). A difference is determined between the lift position of the valve plug 168 read in the step S7 and the lift position of the valve plug 168 based on the counted value obtained by the pulse counter (step S8). A current value control signal is sent to the current amplifier 244 on the basis of the difference determined in the step S8 (step S9).

The current, which has the current value outputted from the current amplifier 244 that has received the current value control signal, is sent to the electromagnetic coil 148. Thus, the valve plug 168 is driven in the direction to close the valve. This state is continued until the predetermined next time measurement timing comes (step S10). If it is judged in the step S10 that the next time measurement timing has come, the routine is executed again by making repetition from the step S5 after the step S10.

The repeated execution is repeatedly performed in a successive manner in the direction to close the valve until it is judged in the step S6 that the valve plug 168 arrives at the fully closed position.

In this embodiment, the lift position of the valve plug 168, which corresponds to the time measurement timing next to the timing at which the lift position of the valve plug 168 is read in the step S5, is read from the valve-closing program control pattern in the following step S7, because of the following reason. That is, it is intended to immediately send the current value control signal at the time of the start of valve closing ($t_0$).

Therefore, after a predetermined amount of the coating liquid is applied to the semiconductor wafer 230, the control unit 242 is used to drive the valve plug 168 of the opening and closing valve 40 in the direction to close the valve. The linear voice coil type driving unit 134 is operated to follow the valve-closing program control pattern, and the stem 140 is displaced in the direction of the arrow A. As shown in FIG. 2A, the thick-walled section 176 of the valve plug 168 is successively moved in the direction toward the seat section 180, and the former finally abuts against the latter. Thus, the communication between the first port 48 and the second port 50 is blocked. Therefore, the dripping of the coating liquid is stopped from the fluid nozzle 234 of the coating liquid-dripping apparatus 236 to the semiconductor wafer 230.

The valve-closing pattern for the valve plug 168, which is adopted when the control is made in accordance with the valve-closing program control pattern described above, follows the valve-closing program control pattern shown in FIG. 4. In this process, when the valve plug 168 is instructed to close the valve starting from the open state, then the valve plug 168 is driven in the direction to close the valve at the steep slope until the position $P_1$, and the valve plug 168 arrives at the position $P_1$ for a short period of time. The valve plug 168 is driven in the direction to close the valve at the gentle slope after the arrival at the position $P_1$ until the valve is closed.

The liquid drip of the coating liquid will now be explained in relation to the opening and closing valve 40 subjected to the valve-closing control in accordance with the valve-closing program control pattern as described above.

The following fact has been confirmed by an experiment. That is, upon the start of the valve-closing process, the coating liquid, which is to be dripped to the wafer 230, remains in the fluid nozzle 234. In this state, when the lift position of the valve plug 168 is quickly lowered to the position $P_1$, and the valve plug 168 is successively driven in the direction to close the valve in accordance with the gentle slope, then the coating liquid, which has remained in the fluid nozzle 234 upon the start of the valve-closing process, maintains the state of being stored in the tube ranging from the opening and closing valve 40 to the fluid nozzle 234. The coating liquid is not dripped as liquid drip from the fluid nozzle 234.

In this case, the slope from the valve-open state to the position $P_1$ and the slope in the direction to close the valve from the position $P_1$ to the valve-closed state are based on the viscosity and the surface tension of the coating liquid. It has been revealed that these slopes are determined on the basis of, for example, the characteristics such as the viscosity and the surface tension of the coating liquid, the pressure of the coating liquid, and the volume up to the forward end of the fluid nozzle 234.

That is, the following assumption is approved. The amount of the coating liquid passing through the opening and closing valve 40 is quickly decreased by quickly driving the opening and closing valve 40 at the steep slope to the position $P_1$ near to the valve-closed state. However, the presence of the coating liquid outflowing from the opening and closing valve 40 at the position $P_1$ decreases the maximum pressure generated by the water hammer phenomenon. Further, a small amount of the coating liquid outflows from the opening and closing valve 40. Thus, the coating liquid, which stays in the region ranging from the opening and closing valve 40 to the fluid nozzle 234, does not undergo liquid drip from the fluid nozzle 234 which would be otherwise caused by overcoming the surface tension of the coating liquid. After that, the valve plug 168 is successively subjected to valve closing at the gentle slope from the position $P_1$ near to the valve-closed state to the complete closure. Therefore, the coating liquid passing through the opening and closing valve 40 is gently decreased. A degree of kinetic energy, which is enough to discharge the coating liquid from the fluid nozzle 234 against the surface tension of the coating liquid, is not given to the coating liquid staying in the region ranging from the opening and closing valve 40 to the fluid nozzle 234. Thus, no liquid drip takes place.

As described above, the liquid drip of the coating liquid can be avoided by setting the valve-closing program control pattern, i.e., the position $P_1$, the slope of movement from the open position of the opening and closing valve 40 to the position $P_1$ of the valve plug 168, and the slope from the position $P_1$ to the valve-closed state, depending on, for example, the temperature, the pressure of the coating liquid, the volume of the tube passage, and the viscosity and the surface tension of the coating liquid.

The linear voice coil type driving unit 134 is electrically controlled. Therefore, it is possible to control the displacement of the stem 140 easily and accurately. Accordingly, the valve plug 168 can be smoothly displaced as shown by solid lines in FIG. 4.

The control unit 242 controls the displacement of the stem 140 on the basis of the signal corresponding to the displacement amount of the stem 140 inputted from the encoder (or lift-detecting means) 160 for the linear voice coil type driving unit 134. Accordingly, it is possible to highly accurately control the displacement of the valve plug 168. Therefore, it is possible to highly accurately control the amount of the coating liquid drawn by the opening and closing valve 40.

In this embodiment, the electric actuator is the linear voice coil type driving unit 134. However, there is no limitation thereto. For example, it is allowable to use an unillustrated linear DC motor or a linear pulse motor. Alternatively, it is allowable to use an electric linear actuator comprising a ball screw provided on a rotary shaft of a rotary DC motor or a rotary stepping motor, wherein the rotational motion of the ball screw is converted into linear motion by using a displacement member.

What is claimed is:

1. An opening and closing valve including a flow passage which is controlled to be open and closed by driving an electric actuator, said opening and closing valve comprising:
   - a storage means which stores a plurality of valve-closing program control patterns corresponding to characteristics of fluid to be allowed to flow through said flow passage in order to avoid liquid drip when said valve is closed, said pattern being defined by a first slope concerning time for a valve plug lift position to arrive at a predetermined valve plug lift position starting from a timing of instruction to close said opening and closing valve, and by a second slope concerning time for said valve plug lift position starting from said arrival at said predetermined valve plug lift position until closure of said valve, said second slope being gentler than said first slope; and
   - a control means for controlling said valve plug lift position in a direction to close said valve by controlling an amount of electric power application to said electric actuator in accordance with said valve-closing program control pattern read from said storage means on the basis of said characteristic of said fluid to be allowed to flow through said passage.

2. The opening and closing valve according to claim 1, wherein said characteristic of said fluid include viscosity and surface tension of said fluid.

3. The opening and closing valve according to claim 1, wherein said predetermined valve plug lift position, said first slope, and said second slope are determined on the basis of viscosity and surface tension of said fluid.

4. The opening and closing valve according to claim 1, wherein said control means comprises a lift-detecting means for detecting said valve plug lift position, a difference-computing means for determining a difference between said valve plug lift position detected by said lift-detecting means and said valve plug lift position based on said valve-closing program control pattern, and a current amount control means for sending a current amount based on said difference determined by said difference-computing means to said electric actuator.

5. The opening and closing valve according to claim 4, wherein said lift-detecting means comprises an encoder installed to a stem of said opening and closing valve, and a counter for counting outputs of said encoder.

6. The opening and closing valve according to claim 1, wherein said valve-closing program control pattern is stored in ROM beforehand.

7. The opening and closing valve according to claim 4, wherein said valve-closing program control pattern is stored in ROM beforehand.

8. The opening and closing valve according to claim 1, comprising a valve plug composed of a diaphragm including a first thin film and a second thin film which are stacked with each other.

* * * * *